US005771771A

United States Patent [19]

Gagliardi, Jr.

[11] Patent Number: 5,771,771

[45] Date of Patent: Jun. 30, 1998

[54] APPARATUS FOR CUTTING A SAUSAGE PRODUCT

[75] Inventor: Eugene D. Gagliardi, Jr., Atglen, Pa.

[73] Assignee: Visionary Design, Inc., Atglen, Pa.

[21] Appl. No.: 732,541

[22] Filed: Oct. 15, 1996

[51] Int. Cl.[6] ............................... A47J 43/00; B26D 1/11

[52] U.S. Cl. ................................ 83/882; 83/620; 83/622; 83/648; 83/879; 83/932

[58] Field of Search ................................ 83/437.1, 437.2, 83/451, 613, 620, 622, 624, 648, 761, 762, 932, 51, 621, 435.15, 870, 872, 873, 879, 880, 882, 883, 885; 99/537, 538, 430, 441

[56] References Cited

U.S. PATENT DOCUMENTS

| | | | |
|---|---|---|---|
| 1,405,401 | 2/1922 | Eger | 83/620 |
| 2,214,217 | 9/1940 | Adams . | |
| 2,509,190 | 5/1950 | Langley . | |
| 2,520,000 | 8/1950 | Dettman . | |
| 2,647,549 | 8/1953 | Koch . | |
| 2,675,580 | 4/1954 | Pesce . | |
| 2,852,053 | 9/1958 | Berry . | |
| 3,356,118 | 12/1967 | Priset . | |
| 3,786,703 | 1/1974 | Piel . | |
| 4,071,950 | 2/1978 | Telesio . | |
| 4,235,941 | 11/1980 | Coats . | |
| 4,337,275 | 6/1982 | Adams . | |
| 4,338,839 | 7/1982 | Farrell, Sr. et al. | 83/620 |
| 4,338,840 | 7/1982 | Farrell, Sr. et al. | 83/622 |
| 4,436,025 | 3/1984 | Jones . | |
| 4,483,226 | 11/1984 | Costarelli | 83/620 X |
| 4,569,280 | 2/1986 | D'Ambro et al. | 83/451 X |
| 4,841,642 | 6/1989 | Kunishima . | |
| 4,976,029 | 12/1990 | Kennedy . | |
| 5,038,649 | 8/1991 | Hoaglin | 83/932 X |
| 5,067,241 | 11/1991 | Goodman . | |
| 5,069,914 | 12/1991 | Gagliardi, Jr. . | |
| 5,101,718 | 4/1992 | Lin . | |
| 5,271,317 | 12/1993 | Aguerrevere . | |
| 5,421,249 | 6/1995 | Repisky et al. | 83/451 X |
| 5,499,578 | 3/1996 | Payne . | |

FOREIGN PATENT DOCUMENTS

| | | | |
|---|---|---|---|
| 484595 | 10/1929 | Germany | 83/620 |
| 488298 | 1/1931 | Germany | 83/620 |
| 474525 | 9/1952 | Italy | 83/620 |
| 379926 | 9/1932 | United Kingdom | 83/620 |

OTHER PUBLICATIONS

"Childhood Asphyxiation by Food", *Joural of the American Medical Association,* May 4, 1984; vol. 251, No. 17, pp. 2231–2232.

"Childhood Asphyxiation by Choking or Suffocation", *Journal of the American Medical Association,* Sep. 19, 1980, vol. 244, No. 12, pp. 1343–1346.

*Primary Examiner*—Clark F. Dexter
*Attorney, Agent, or Firm*—Panitch Schwarze Jacobs & Nadel, P.C.

[57] ABSTRACT

An apparatus for cutting a sausage product has an elongate, generally cylindrical housing and a generally annular cutter member. The housing has an axis, a circumferential side wall with radial inner and outer surfaces, and first and second axial ends. The housing defines a cutting chamber sized for receiving the sausage product, and the side wall includes a plurality of elongate, generally parallel axial slots extending therethrough. The slots are generally equally spaced from each other around the circumference of the side wall. The cutter member has an axial length and a curved inner circumferential surface with a diameter at least slightly greater than that of the outer surface of the housing side wall. The cutter member extends around and is coaxial with the housing, and includes a plurality of generally radially inwardly extending blades, where the blades are spaced from each other around the circumference of the cutter member so that each blade is generally aligned with and extends through one of the housing slots and into the cutting chamber. Accordingly, axial movement of the cutter member with respect to the housing results in a plurality of generally parallel axially extending cuts being made into the sausage product located within the cutting chamber.

10 Claims, 2 Drawing Sheets

APPARATUS FOR CUTTING A SAUSAGE PRODUCT

FIELD OF THE INVENTION

The present invention relates generally to an apparatus for cutting hot dogs and similar sausage food products. More particularly, the present invention relates to an apparatus for cutting a hot dog such that a bitten-off or severed section breaks into several small pieces or segments, thereby reducing the risk of choking.

BACKGROUND OF THE INVENTION

As is known, eating a hot dog or other similarly shaped food product can be hazardous to small children and others. In particular, if an individual bites off a piece of the hot dog, fails to sufficiently chew the bitten-off piece, and then attempts to swallow, the piece may block the airway of the individual and result in serious injury or even death. Accordingly, a need exists for a product that lessens such risk of blockage.

As is also well known, a hot dog or other similarly shaped food product is typically formed with a skin or skin-like exterior and has a straight, elongate shape. When cooked, such hot dog swells, and the swelling may cause the exterior to rupture. If such a rupture occurs, the shape of the hot dog may become distorted and bent out of the straight, elongate shape. Such a distorted hot dog is aesthetically unpleasant and visually unappetizing.

To prevent such a rupture, the hot dog may be held by hand and the exterior of the hot dog may be slit by a knife or other sharp object. However, the use of such knife is inherently dangerous since the knife can easily slip from the hot dog and cut the hand and/or other body parts. Accordingly, a need exists for a product for safely slitting such hot dog.

SUMMARY OF THE INVENTION

The aforementioned needs are satisfied by an apparatus for cutting a sausage product where the apparatus has an elongate, generally cylindrical housing and a generally annular cutter member. The housing has an axis, a circumferential side wall with radial inner and outer surfaces, and first and second axial ends. The housing defines a cutting chamber sized for receiving a sausage product, and the side wall includes a plurality of elongate, generally parallel axial slots extending therethrough. The slots are generally equally spaced from each other around the circumference of the side wall.

The cutter member has an axial length and a curved inner circumferential surface with a diameter at least slightly greater than that of the outer surface of the housing side wall. The cutter member extends around the housing to be generally coaxial therewith. The cutter member includes a plurality of generally radially inwardly extending blades, where the blades are spaced from each other around the circumference of the cutter member so that each blade is generally aligned with and extends through one of the housing slots and into the cutting chamber. Accordingly, axial movement of the cutter member with respect to the housing results in a plurality of generally parallel axially extending cuts being made into a sausage product located within the cutting chamber.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENT

Figure 1:
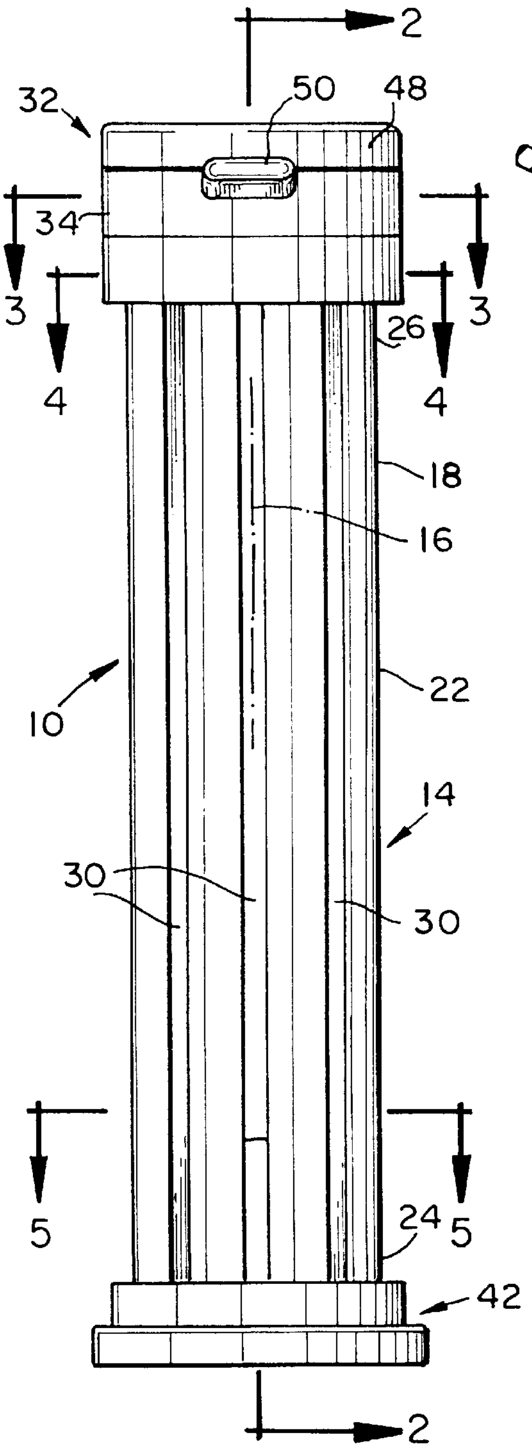
FIG. 1 is a side elevational view of a preferred embodiment of an apparatus for cutting a hot dog and similar food products in accordance with the present invention.

Certain terminology may be used in the following description for convenience only and is not limiting. The words “left”, “right”, “upper” and “lower” designate directions in the drawings to which reference is made. The words “inwardly” and “outwardly” are further directions toward and away from, respectively, the geometric center of a referenced object. The terminology includes the words above specifically mentioned, derivatives thereof, and words of similar import.

Referring to the drawings in detail, wherein like numerals are used to indicate like elements throughout, there is shown in FIGS. 1–5 an apparatus 10 for cutting a hot dog 12 or the like constructed in accordance with a preferred embodiment of the present invention. It should be understood that all references to the term “hot dog” should be taken to mean any and all cylindrical elongate sausage food products of a type which is characteristic of a hot dog, of a uniform or non-uniform composition or of any such cross-sectional shape. Though the drawings generally illustrate an apparatus for a generally straight hot dog, it should expressly be understood that the preferred embodiment of the present invention may also be employed with a curved hot dog.

Typically, the hot dog 12 is a ground or emulsified mix of meat, cereal, is formed into a generally elongate cylindrical shape with substantially hemispherical ends, and is precooked prior to sale to the consumer. The hot dog 12 as received by the consumer may be approximately 0.625 inches (15.9 millimeters) in diameter and 5 inches (127 millimeters) in length, although many other dimensions are common. For example, hot dog-type sausage food products such as sausages, wursts, and the like usually have greater lengths and diameters.

Figure 2:
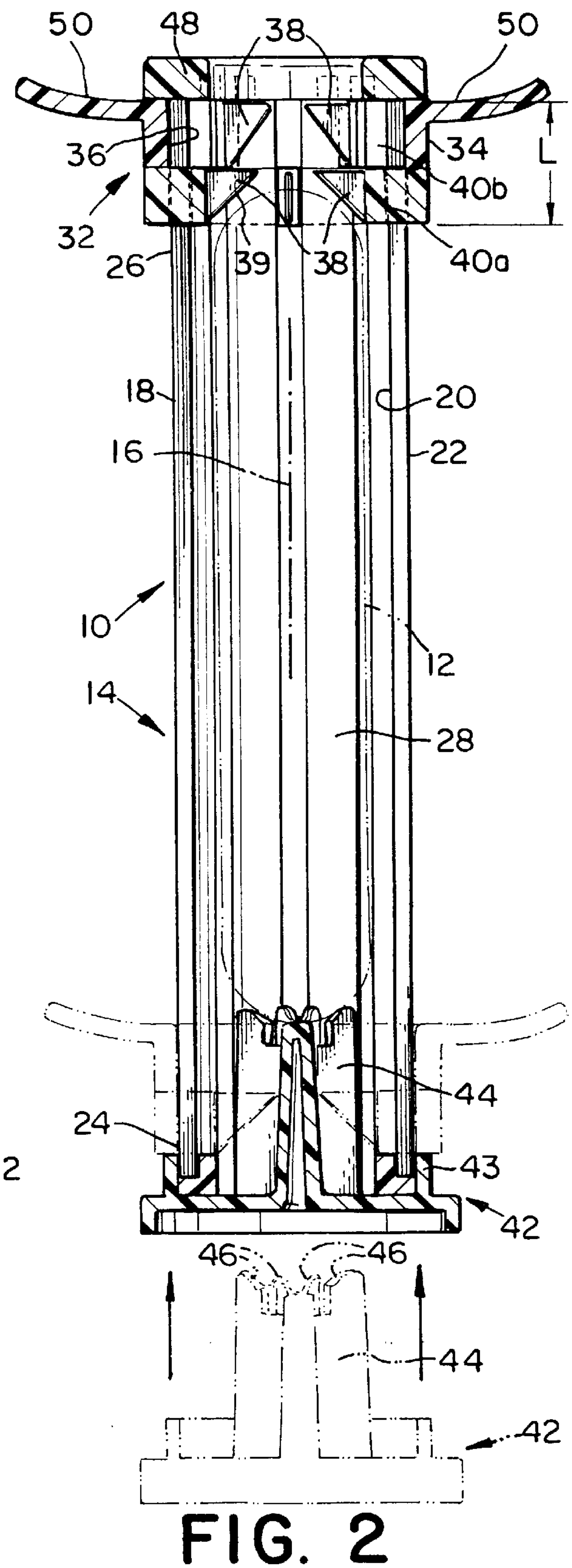
FIGS. 2–5 are cross-sectional views of the apparatus taken along lines 2—2, 3—3, 4—4, and 5—5, respectively, of FIG. 1.

The apparatus 10 includes an elongate generally cylindrical housing 14 having an axis 16, and a circumferential side wall 18, as shown in FIG. 1. The side wall 18 has radially inner and outer surfaces 20, 22 (FIGS. 2–5), and the housing also has first and second axial ends 24, 26 (FIGS. 1 and 2). As particularly seen in FIGS. 2–5, the housing 14 defines a cutting chamber 28 sized for receiving the hot dog 12. The side wall 18 includes a plurality of elongate, generally parallel axial slots 30 that extend through the side wall 18. As will be explained in more detail below, at least some and preferably all of the slots 30 correspond to slits to be made in the exterior of the hot dog 12.

In the preferred embodiment of the present invention, eight slots 30 are generally equally spaced from each other around the circumference of the side wall 18. However, one skilled in the art will recognize that a greater or lesser number of slots 30 may be provided in the side wall 18 of the housing 14 and that the slots 30 may be unevenly spaced without departing from the spirit and scope of the present invention. For example, if the apparatus is sized for a larger diameter product such as a knockwurst, twelve or sixteen slots 30 may be provided.

Figure 3:
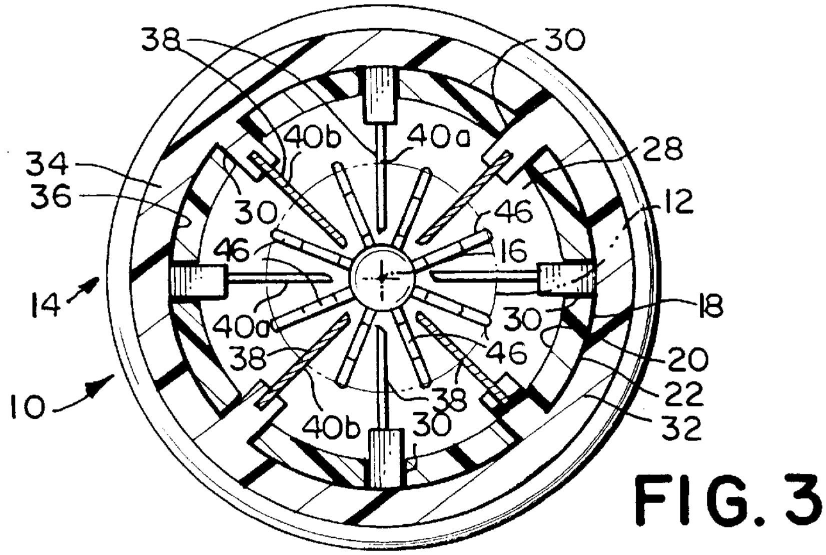
Figure 4:
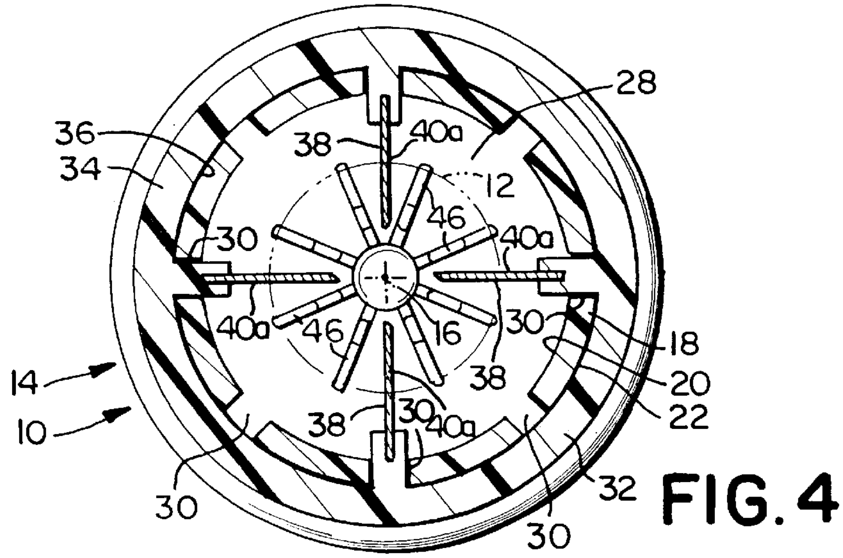

In the preferred embodiment of the present invention, the apparatus 10 also has a generally annular cutter member 32. As seen in FIG. 2, the cutter member 32 has an axial length L. As seen in FIGS. 3 and 4, the cutter member 32 has a generally annular body 34 with a curved inner circumferential surface 36. The cutter member 32 extends around and is generally coaxial with the housing 14. Accordingly, the inner surface 36 has a diameter that is at least slightly greater than the diameter of the outer surface 22 of the housing side wall 18.

The cutter member 32 includes a plurality of generally radially inwardly extending blades 38. As particularly seen in FIGS. 2 and 3, each blade 38 is a generally planar member with a cutting edge 39, where the planar member resides in a plane generally parallel with respect to the axis 16 and the cutting edge is generally diagonally oriented with respect to the axis 16 and facing toward the first end 24 of the housing 14. Preferably, the blades 38 are spaced generally evenly around the circumference of the cutter member 32, and each blade 38 is generally aligned with and extends through one of the slots 30 of the housing 14 and into the cutting chamber 28.

As shown in FIG. 2, the cutter member 32 may be axially moved with respect to the housing 14 from a first position to a second position. In the first position, the cutter member 32 (shown in solid in FIG. 2) is adjacent the second end 26 of the housing 14. In the second position, the cutter member 32 (shown in phantom in FIG. 2) is adjacent the first end 24 of the housing 14. As should now be understood, when the hot dog 12 is positioned within the cutting chamber 28, the movement of the cutter member 32 from the first position to the second position causes each of the blades 38 to slit the hot dog 12.

More particularly, by the axial movement of the cutter member 32, the blades 38 make a plurality of generally parallel axially extending cuts or slices through the exterior and into the hot dog 12 located within the cutting chamber 28. Preferably, in both the first and second positions of the cutter member 32, the blades 38 are not in contact with the hot dog 12. Accordingly, the slits made by the blades 38 extend along substantially the entire axial length of the hot dog 12 from one end to the other.

Preferably, and as seen in FIGS. 2 and 3, the cutter member 32 has one blade 38 for each slot 30 of the housing 14 such that one blade 38 resides within each slot 30. However, one skilled in the art will recognize that other numbers of blades 38 may be employed and/or the blades 38 may be unevenly spaced without departing from the spirit and scope of the present invention.

Preferably, and as best seen in FIG. 2, the blades 38 on the cutter member 32 are organized into first and second tiers 40*a*, 40*b*. As particularly seen in FIGS. 3 and 4, the first tier 40*a* preferably includes four spaced blades 38 at a first axial position with respect to the housing 14 and the second tier 40*b* includes four spaced blades 38 at a second axial position with respect to the housing 14. Preferably, and as best seen in FIG. 3, the blades of the first tier 40*a* are staggered with respect to the blades of the second tier 40*b*. As shown, the blades 38 of the first tier 40*a* are spaced about 90 degrees from each other, the blades 38 of the second tier 40*b* are likewise spaced about 90 degrees from each other, and each blade 38 in the first tier 40*a* is circumferentially offset about 45 degrees from a circumferentially adjacent blade 38 in the second tier 40*b*.

As shown, when the cutter member 32 is moved from the first position toward the second position, the blades 38 of the first tier 40*a* contact the hot dog 12 first, while the blades 38 of the second tier 40*b* are delayed in contacting the hot dog 12 until the first tier 40*a* has already penetrated the exterior of the hot dog 12. As should be appreciated, such an arrangement is preferable in that the pressure necessary to initiate four cuts simultaneously in the exterior of the hot dog 12 is less than the pressure necessary to initiate eight such cuts simultaneously. As one skilled in the art will recognize, the preferred embodiment of the present invention may have a different number of tiers of blades 38 in the cutter member 32 and a different arrangement of the blades 38 without departing from the spirit and scope of the present invention. For example, if the cutter member 32 is to have twelve blades 38, the blades may be organized into three staggered tiers.

Preferably, each blade 38 extends a predetermined distance into the cutting chamber 28, where such predetermined distance is less than the distance to the axis 16. Accordingly, the hot dog 12 is not severed within the cutting chamber 28 into discrete pieces when the cutter member 32 is moved from the first position to the second position, and at least a portion of the hot dog 12 proximate the axis 16 is not cut. As a result, the slitted hot dog 12 remains as a unitary body. Preferably, the un-cut portion of the hot dog 12 has a diameter of at least one-quarter of an inch, and acts as a core from which the cut portions of the hot dog 12 radiate.

Preferably, and referring now to FIG. 2, the apparatus 10 includes a generally circular base member 42 that is removably secured to the first end 24 of the housing 14. As seen, the base member 42 may be inserted into the housing 14 by coaxially aligning the base member 42 at a first position (shown in phantom in FIG. 2), and then axially guiding the base member 42 into contact with the housing 14 (as shown in solid in FIG. 2). Preferably, the base member 42 maintains an interference fit with the housing 14 by way of an annular base flange 43.

Figure 5:
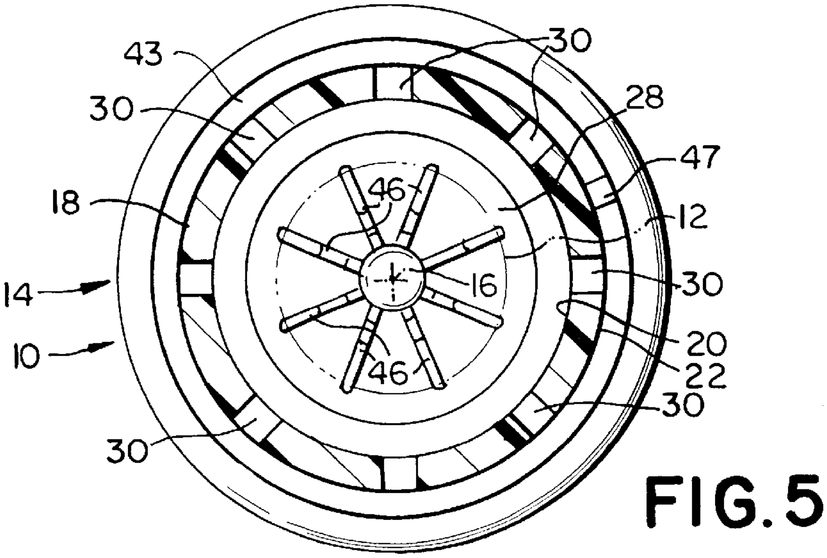

Preferably, and as seen in FIGS. 2 and 5, the base flange 43 is generally coaxial with the housing 14 and the base member 42, extends axially from the base member 42 toward the second end 26 of the housing 14, and is sized to encircle the outer surface 22 of the side wall 18. As shown, when the base member 42 is secured to the housing 14, the base flange 43 aids in limiting the movement of the cutter member 32 toward the first end 24 of the housing 14, and helps to define the second position of the cutter member 32 as was described above. Preferably, the slots 30 extend along the side wall 18 of the housing 14 short of the farthest extreme of the first end 24 and are closed at such farthest extreme. Preferably, the closures at such farthest extreme contact a non-sharp, posterior portion of each blade 38 of the first tier 40*a* to limit the movement of the cutter member 32 toward the first end 24 of the housing 14 and to define the second position of the cutter member 32 along with the base flange 43.

As seen, the base member 42 includes a pedestal or support member 44 that is generally coaxial with and extends into the cutting chamber 28. Accordingly, the hot dog 12 is inserted through an aperture in the first end 24 of the housing 14 and is positioned within the housing 14 by being coaxially aligned with the housing 14, the pedestal 44, and the base member 42 as the base member is inserted into the housing 14. Preferably, the pedestal supports the hot dog 12 in the cutting chamber 28 a predetermined distance from the first end 24 of the housing 14. As should be understood, the predetermined distance generally corresponds to the axial length L of the cutter member 32, such that the blades 38 in both the first and second tiers 40*a,* 40*b* of the cutter member 32 slice through the complete length of the hot dog 12.

Preferably, and as best seen in FIGS. 2 and 5, the pedestal 44 includes a plurality of spaced, radially extending support fins 46 for supporting the hot dog 12 within the cutting chamber 28. Although eight fins 46 are shown, one skilled in the art will recognize that a different number of such fins 46 may be employed without departing from the spirit and scope of the present invention. For example, four evenly spaced fins 46 may be employed. Moreover, one skilled in the art will recognize that the fins 46 need not be evenly spaced while still being within the spirit and scope of the present invention.

However, and as is shown in FIG. 3, it is necessary that each fin 46 be positioned so as to prevent interference with the blades 38 in both the first and second tiers 40*a,* 40*b*. Preferably, and as shown, each blade 38 in the first or second tier 40*a,* 40*b* is circumferentially spaced about 45 degrees from a circumferentially adjacent blade 38, as was described above, and each fin 46 is circumferentially offset about 22.5 degrees from a circumferentially adjacent blade 38.

Preferably, and as shown in FIG. 5, the base member 42 and the housing 14 in combination include a reference device 47 to ensure that the fins 46 are properly positioned with respect the blades 38 when the base member 42 is secured to the housing 14. As seen, the reference device 47 is at the base flange 43 and at the outer surface 22 of the side wall 18 of the housing 14. As should be understood, the reference device 47 limits the fins 46 to a circumferential position that does not interfere with the blades 38. Preferably, the reference device 47 includes a notch in the base flange 43 and a matched key on the housing 14, although one skilled in the art will recognize that other types and arrangements of reference devices may be employed while still being within the spirit and scope of the present invention.

Preferably, and referring now to FIGS. 1 and 2, the apparatus 10 includes an annular coaxially positioned cap member 48 secured to the second end 26 of the housing 14. As seen, the cap member 48 has a radial outer dimension at least slightly greater than the diameter of the inner circumferential surface 36. Accordingly, the cap member 48 limits the movement of the cutter member 32 toward the second end 26 of the housing 14, and defines the first position of the cutter member 32 as was described above.

Preferably, when the cap member 48 is not secured to the second end 26 of the housing 14, the slots 30 extend along the side wall 18 of the housing 14 to the farthest extreme of the second end 26 and are open at such farthest extreme. Accordingly, in constructing the apparatus 10, the cutter member 32 is preferably slipped onto the housing 14 at the second end 26 and the blades 38 are positioned within the open slots 30 prior to the attachment of the cap member 48. The slots 30 are closed when the cap member 48 is secured to the second end 26 of the housing 14.

Preferably, the cap member 48 is epoxied, sonic welded, fused, or otherwise permanently secured to the housing 14. However, one skilled in the art will recognize that the cap member 48 may be removably secured to the housing 14 if so desired without departing from the spirit and scope of the present invention. For example, the cap member 48 may be screwed or snapped onto the housing 14.

Preferably, and as best seen in FIGS. 1 and 2, the cutter member 32 includes a pair of gripping members 50 that extend generally radially outwardly with respect to the housing 14. As should be understood, the gripping members 50 facilitate the application of pressure by an individual to move the cutter member 32 with respect to the housing 14 from the first position to the second position. Preferably, the apparatus 10 is placed in an upright position with the base member 42 down and the cap member 48 up during such application of pressure. Although only two gripping members 50 are shown, one skilled in the art will recognize that a larger number of gripping members 50 may be employed and that the gripping member 50 may be replaced with a substantially coaxial gripping ring or the like without departing from the spirit and scope of the present invention.

Preferably, the housing 14, the cutter member 32 including the blades 38, the base member 42 and support member 44, and the cap member 48 are constructed from a polymeric material. For example, the polymeric material may be polystyrene. However, one skilled in the art will recognize that other materials may be employed without departing from the spirit and scope of the present invention. For example, the blades 38 of the cutter member 32 may be steel blades.

As should now be appreciated, with the apparatus 10 of the preferred embodiment of the present invention, the exterior of the hot dog 12 is provided with a plurality of generally parallel axially extending slits, and the slits prevent the hot dog from rupturing. Further, it has been found that by making the axial slits with a predetermined depth and then cooking the hot dog 12, a bitten-off piece of the cooked hot dog 12 will break down into smaller discrete pieces defined by the slits with little if any chewing required. As should be understood, then, the risk of choking on such smaller discrete pieces of the cooked hot dog 12 is less then the risk of choking on one larger piece.

From the foregoing description, it can be seen that the present invention comprises a new and useful apparatus for cutting a hot dog and similar sausage food products. It will be appreciated by those skilled in the art that changes can be made to the embodiment described above without departing from the broad inventive concepts thereof. It is understood, therefore, that this invention is not limited to the particular embodiment disclosed but is intended to cover modifications within the spirit and scope of the present invention as defined by the appended claims.

I claim:

1. An apparatus for cutting an elongate sausage product comprising:

an elongate generally cylindrical housing having an axis, a circumferential side wall with radially inner and outer surfaces, and first and second axial ends, the housing defining a cutting chamber for receiving a sausage product, the side wall including a plurality of elongate generally parallel axial slots extending therethrough, the slots being spaced from each other around the circumference of the side wall; and a generally annular cutter member having an axial length and a curved inner circumferential surface with a diameter at least slightly greater than that of the outer surface of the housing side wall, the cutter member extending around the outer surface of the housing to be generally co-axial therewith and being axially movable with respect to the housing, the cutter member including a plurality of generally radially inwardly extending blades, the blades being spaced from each other around the circumference of the cutter member, wherein each blade is generally aligned with and extends through one of the housing slots and into the cutting chamber, whereby axial movement of the cutter member with respect to the housing results in a plurality of generally parallel axially extending cuts being made into a sausage product located within the cutting chamber;

a generally circular base member removably secured to the first end of the housing, the base member including a support member extending into the cutting chamber a predetermined distance from the first end of the housing for supporting the sausage product; and an annular cap member secured to the second end of the housing, the cap member having a radial outer dimension at least slightly greater than the diameter of the inner circumferential surface of the cutter member so that the cap member limits movement of the cutter member toward the second end of the housing.

2. The apparatus as recited in claim 1 wherein the predetermined distance is at least as long as the axial length of the cutter member.

3. The apparatus as recited in claim 1 wherein the support member includes a plurality of spaced, radially extending support fins.

4. An apparatus for cutting an elongate sausage product comprising:

an elongate generally cylindrical housing having an axis, a circumferential side wall with radially inner and outer surfaces, and first and second axial ends, the housing defining a cutting chamber for receiving a sausage product, the side wall including a plurality of elongate generally parallel axial slots extending therethrough, the slots being spaced from each other around the circumference of the side wall; and a generally annular cutter member having an axial length and a curved inner circumferential surface with a diameter at least slightly greater than that of the outer surface of the housing side wall, the cutter member extending around the outer surface of the housing to be generally co-axial therewith and being axially movable with respect to the housing, the cutter member including a plurality of generally radially inwardly extending blades, the blades being spaced from each other around the circumference of the cutter member, wherein each blade is generally aligned with and extends through one of the housing slots and into the cutting chamber, whereby axial movement of the cutter member with respect to the housing results in a plurality of generally parallel axially extending cuts being made into a sausage product located within the cutting chamber, wherein the blades of the cutter member are arranged in two tiers with the blades in one tier being staggered with respect to the blades in the other tier.

5. The apparatus as recited in claim 4 wherein the cutter member further includes a pair of generally radially outwardly extending gripping members to facilitate movement of the cutter member with respect to the housing.

6. The apparatus as recited in claim 4 wherein the cutter member includes at least four of said blades.

7. The apparatus as recited in claim 4 wherein the cutter member includes eight of said blades.

8. The apparatus as recited in claim 4 wherein the housing and the cutter member are made of a polymeric material.

9. The apparatus as recited in claim 8 wherein the polymeric material comprises polystyrene.

10. The apparatus as recited in claim 4 wherein the cutting chamber has an axial length, and wherein the cutter member is axially movable along substantially the entire axial length of the cutting chamber, whereby the sausage product is cut along its entire axial length from one end to the other.

* * * * *